(12) United States Patent
Leasure

(10) Patent No.: US 6,963,284 B2
(45) Date of Patent: Nov. 8, 2005

(54) LEVEL FOR INDICATING OBJECT TILT ALONG USER LINE OF SIGHT

(76) Inventor: Harold A. Leasure, 7930 NW. 13th St., Pembroke Pines, FL (US) 33024-5113

( * ) Notice: Subject to any disclaimer, the term of this patent is extended or adjusted under 35 U.S.C. 154(b) by 90 days.

(21) Appl. No.: 10/371,821

(22) Filed: Feb. 21, 2003

(65) Prior Publication Data

US 2003/0226269 A1 Dec. 11, 2003

Related U.S. Application Data

(63) Continuation-in-part of application No. 10/163,115, filed on Jun. 5, 2002, now abandoned.

(51) Int. Cl.$^7$ ............................................. G08B 21/00
(52) U.S. Cl. ..................... 340/612; 340/618; 340/689; 340/686.1; 340/693.5; 33/373; 33/374; 33/382
(58) Field of Search .................................... 340/612, 618, 340/686.1, 689; 33/334, 382, 390, 373, 374, 384; 73/304 R, 290 R; 116/203, 206, 211, 215

(56) References Cited

U.S. PATENT DOCUMENTS

| | | | | | |
|---|---|---|---|---|---|
| 1,669,035 A | * | 5/1928 | Belfield | ....................... | 33/379 |
| 3,673,696 A | * | 7/1972 | Wasson | ....................... | 33/348 |
| 4,189,726 A | * | 2/1980 | Rosa et al. | ................. | 340/689 |
| 4,432,146 A | * | 2/1984 | Klein | .......................... | 33/334 |
| 6,029,359 A | * | 2/2000 | Szumer | ....................... | 33/373 |

* cited by examiner

Primary Examiner—Hung Nguyen
(74) Attorney, Agent, or Firm—Frank L. Kubler

(57) ABSTRACT

A level apparatus for indicating the orientation relative to vertical of a surface of an object extending along a user line of sight, including a fluid vessel containing an indicator fluid including a liquid and having a fluid surface, the fluid vessel having a vessel abutment region with a rearward abutment wall for placing against a surface of an object to be evaluated for tilt and with a forward display wall including a fluid display window extending generally perpendicular to the user line of sight, the fluid surface being visible in the fluid display window when the abutment wall is substantially upright, and includes a vessel reservoir region extending at least one of: rearwardly and forwardly from the vessel abutment region along the user line of sight, the vessel abutment region and the vessel reservoir region being in mutual fluid communication.

16 Claims, 6 Drawing Sheets

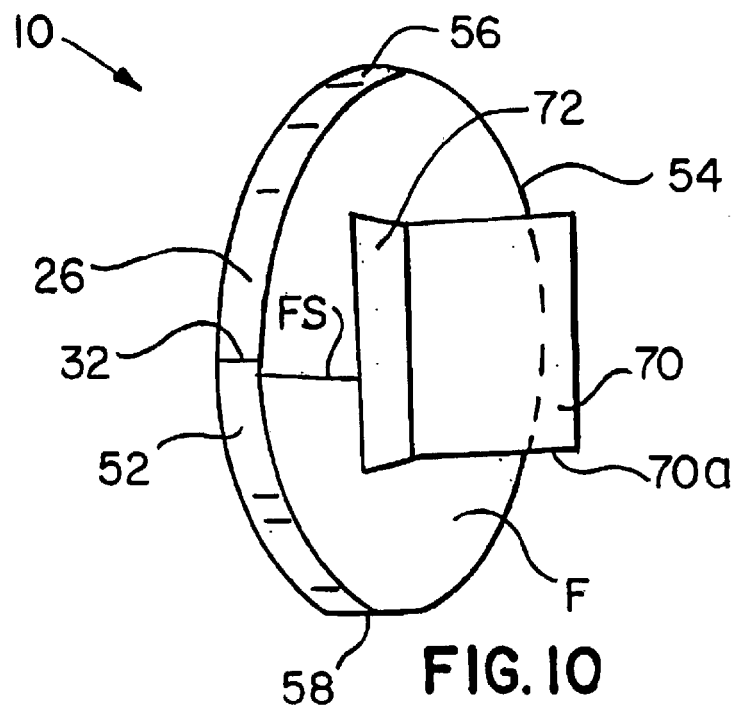
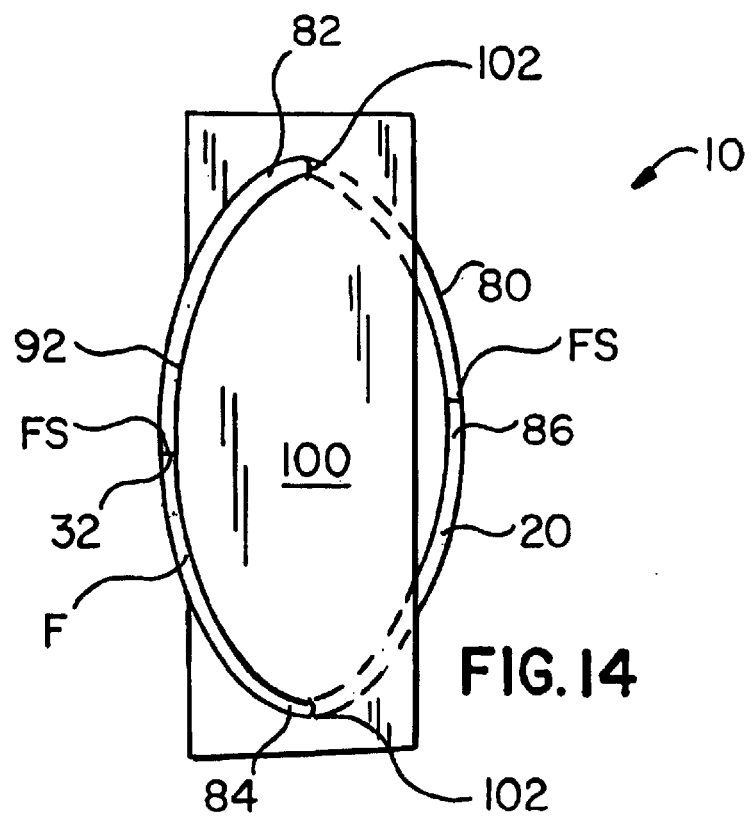

LEVEL FOR INDICATING OBJECT TILT ALONG USER LINE OF SIGHT

FILING HISTORY

This application is a continuation-in-part of application Ser. No. 10/163,115 filed on Jun. 5, 2002 now abandoned.

BACKGROUND OF THE INVENTION

1. Field of the Invention

The present invention relates generally to the field of levels which indicate the orientation of a surface relative to horizontal or vertical. More specifically the present invention relates to a level apparatus for indicating the tilt of an object surface toward or away from a user, or in other words along the user line of sight rather than across the user line of sight, such as for continuously indicating to a driver seated in a load-carrying fork lift truck the forward or rearward tilt of the truck to prevent hazardous forward or rearward instability, and for indicating to a construction worker whether an upright building element is truly vertical or is tilted toward or away from the worker. The level apparatus includes a fluid vessel containing an-indicator fluid in the form of a liquid which preferably is pigmented for easy visibility, the fluid vessel having a vessel abutment region with a rearward abutment wall for placing flat against a surface to be evaluated for tilt and with a forward display wall including a fluid display window extending perpendicular to the user line of sight with a fluid level indicating mark, the fluid surface being visible in the fluid display window when the abutment wall is upright and the apparatus is thus oriented for use, and includes a vessel reservoir region extending either rearwardly or forwardly from the vessel abutment region along the user line of sight, the vessel abutment region and vessel reservoir region being in mutual fluid communication so that fluid in the vessel reservoir region either flows into or out of the vessel abutment region depending on the tilt of the level along the user line of sight. The vessel reservoir region contains a sufficient quantity of fluid that forward or rearward tilting of the rearward abutment wall a number of degrees considered significant for the intended use creates a readily apparent change in the position of the fluid surface in the fluid display window relative to the fluid level indicating mark to make the tilt of the apparatus and object surface noticeable to the user. Another embodiment is provided in which the reservoir region is either omitted or combined into the abutment region so that the abutment region and reservoir region together define a single fluid chamber, which will be referred to as a display chamber. Tubular embodiments are also provided.

2. Description of the Prior Art

There have long been levels for determining whether an upright surface of an object tilts to the left or to the right across the user line of sight. A problem with these prior levels has been that they do not indicate the tilt of an upright surface toward or away from the user, along the user line of sight. The user is forced to circle around an object, such as a post or column, to take a series of level readings, or two users must take simultaneous level readings, along perpendicular directions. What is needed is a level apparatus which indicates tilt toward or away from a user, and which can be structurally combined with or used in combination with a conventional level, to indicate the tilt of an upright member along and across the line of sight at the same time.

It is thus an object of the present invention to provide a level apparatus which indicates to a user the orientation of an upright object relative to vertical along the line of sight of the user.

It is another object of the present invention to provide such a level apparatus which can be structurally combined with or used in combination with a conventional level to simultaneously indicate the tilt of an upright object both along and across the user line of sight.

It is still another object of the present invention to provide such a level apparatus which is operable in a fully inverted position to be reversible and fit around a left hand corner or around a right hand corner of an upright object and give the user the level reading.

It is finally an object of the present invention to provide such a level apparatus which is simple in design, compact, light in weight, sturdy and inexpensive to manufacture.

SUMMARY OF THE INVENTION

The present invention accomplishes the above-stated objectives, as well as others, as may be determined by a fair reading and interpretation of the entire specification.

A level apparatus is provided for indicating the orientation relative to vertical of a surface of an object extending along a user line of sight, including a fluid vessel containing an indicator fluid including a liquid and having a fluid surface, the fluid vessel having a vessel abutment region with a rearward abutment wall for placing against a surface of an object to be evaluated for tilt and with a forward display wall including a fluid display window extending generally perpendicular to the user line of sight, the fluid surface being visible in the fluid display window when the abutment wall is substantially upright, and includes a vessel reservoir region extending at least one of: rearwardly and forwardly from the vessel abutment region along the user line of sight, the vessel abutment region and the vessel reservoir region being in mutual fluid communication so that the fluid in the vessel reservoir region flows into and out of the vessel abutment region depending on the tilt of the apparatus along the user line of sight and thereby alters the elevation of the fluid surface in the fluid display window; where the reservoir region contains a sufficient quantity of the fluid that substantial tilting of the abutment wall in one of a forward direction and a rearward direction creates a readily apparent change in the position of the fluid surface visible in the fluid display window to make the tilt of the apparatus and of the surface of the object noticeable to the user.

The fluid preferably is pigmented for easy visibility. The vessel abutment region and the vessel reservoir region are upright boxes which are joined in full fluid communication at box ends to form a vessel which is substantially L-shaped along a horizontal cross-section. The fluid display window optionally is a panel inset into a port in the display wall.

The level apparatus preferably additionally includes a fluid indicating mark on the display window for comparison with the position of the fluid surface. The level apparatus optionally includes several of the fluid level indicating marks to indicate the extent of apparatus and object surface tilt. The vessel abutment region and the vessel reservoir region optionally are each shaped substantially as hollow half circular cylinders.

The vessel alternatively is configured as a length of tube joined at its ends to form a continuous and substantially rectangular tube loop, the tube loop including upper and lower generally horizontal tube segments and first and second generally vertical tube segments, the tube being bent at opposing vessel region dividing points along the upper and lower horizontal tube segments to define on one side of the vessel abutment region and on the other side the vessel reservoir region, the tube containing the fluid.

A level apparatus is further provided for indicating the orientation relative to vertical of a surface of an object extending along a user line of sight, including a fluid vessel containing an indicator fluid including a liquid and having a fluid surface, the fluid vessel having a vessel abutment structure for placing against a surface of an object to be evaluated for tilt and having a forward display wall including a fluid display window for extending generally perpendicular to the user line of sight, the fluid surface being visible in the fluid display window when the abutment wall is substantially upright so that the fluid in the vessel flows against and away from the fluid display window depending on the tilt of the apparatus along the user line of sight and thereby alters the elevation of the fluid surface visible in the fluid display window; where the vessel is of sufficient depth along the user line of sight that substantial tilting of the vessel in one of a forward direction and a rearward direction creates a visible change in the position of the fluid surface visible in the fluid display window to make the tilt of the apparatus and thus of the surface of the object observable to the user.

Once again, the fluid preferably is pigmented for easy visibility. The fluid display window optionally is a panel inset into a port in the display wall. The level apparatus preferably additionally includes a fluid indicating mark on the display window for comparison with the position of the fluid surface. The level apparatus preferably includes several of the fluid level indicating marks to indicate the extent of apparatus and object surface tilt.

The vessel preferably is configured as a length of tube joined at its ends to form a continuous and substantially rectangular tube loop, the tube loop including upper and lower generally horizontal tube segments and first and second generally vertical tube segments. The vessel abutment structure preferably is connected to and projecting laterally from the vessel and has an abutment surface substantially parallel to the display window, for placing against a surface of an object to be evaluated for tilt.

A level apparatus is still further provided for indicating the orientation relative to vertical of two surfaces of an object, including a fluid vessel containing an indicator fluid including a liquid and having a fluid surface, the fluid vessel including at least two vessel abutment regions each having an abutment wall, the abutment walls being substantially perpendicular to each other, so that the abutment walls may be placed against substantially perpendicular surfaces of an object to be evaluated for tilt in two directions simultaneously, and each vessel abutment region having a forward display wall including a fluid display window so that the fluid display windows are viewable within a user line of sight simultaneously, the fluid surface being visible in both the fluid display windows when the abutment walls are substantially upright, so that the fluid in the vessel flows against and away from the fluid display windows depending on the tilt of the apparatus at least one of: forwardly and rearwardly and laterally, and thereby alters the elevation of the fluid surface in each fluid display windows; where the vessel is of sufficient depth along the user line of sight that substantial tilting of the vessel in one of a forward direction and a rearward direction and a lateral direction creates a readily apparent change in the position of the fluid surface visible in each fluid display window to make the tilt of the apparatus and thus of the surfaces of the object in two substantially perpendicular directions simultaneously observable to the user.

BRIEF DESCRIPTION OF THE DRAWINGS

Various other objects, advantages, and features of the invention will become apparent to those skilled in the art from the following discussion taken in conjunction with the following drawings, in which:

FIG. 10 is a perspective view of the circular version of FIGS. 9 and 9a, showing the abutment panel.

FIG. 14 is a perspective view of the circular version of FIGS. 13 and 13a, showing the abutment panel.

DETAILED DESCRIPTION OF THE PREFERRED EMBODIMENTS

Figure 1:
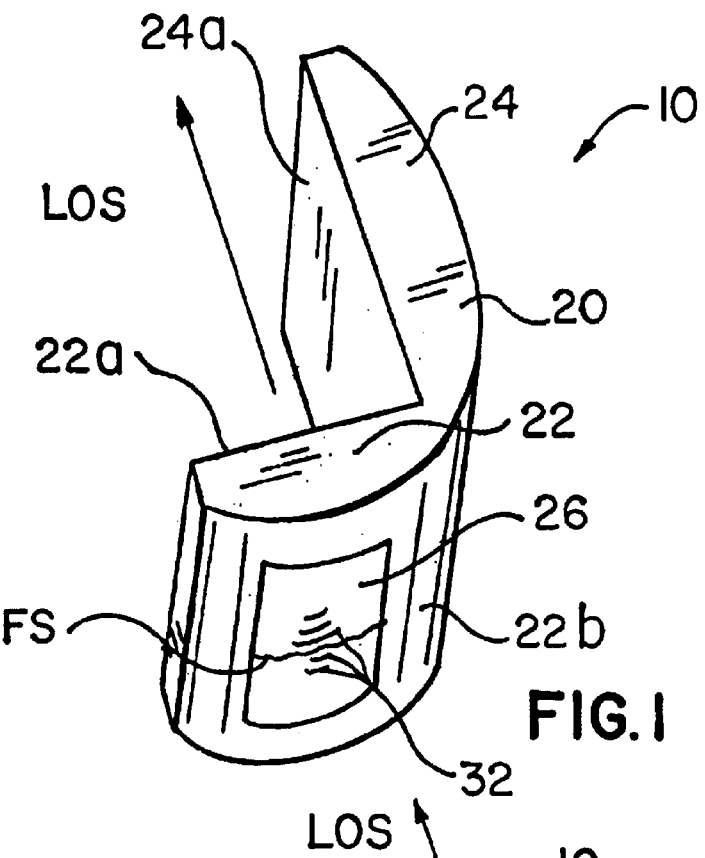
FIG. 1 is a perspective front view of the first preferred embodiment having an opaque housing with a transparent display window, the abutment and reservoir regions having the optional semi-cylindrical shape.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
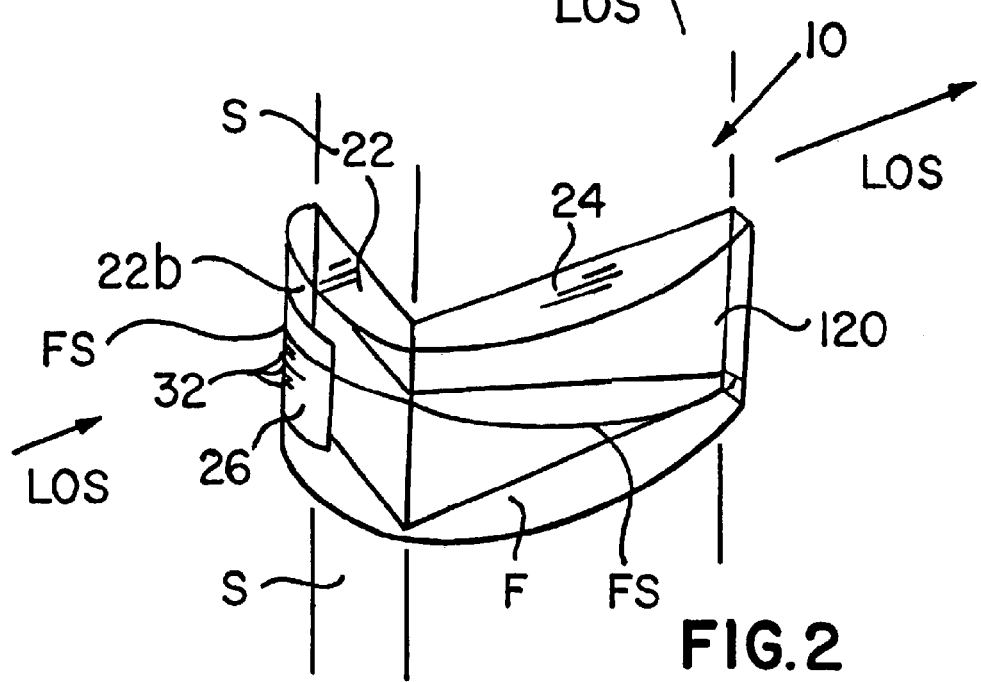
FIG. 2 is a perspective side view of the embodiment of FIG. 1 fitted against a surface of an upright object such as a column, the housing being transparent and revealing the indicator fluid with a fluid surface indicating an object surface tilt toward the display window/apparatus user.
Figure 3:
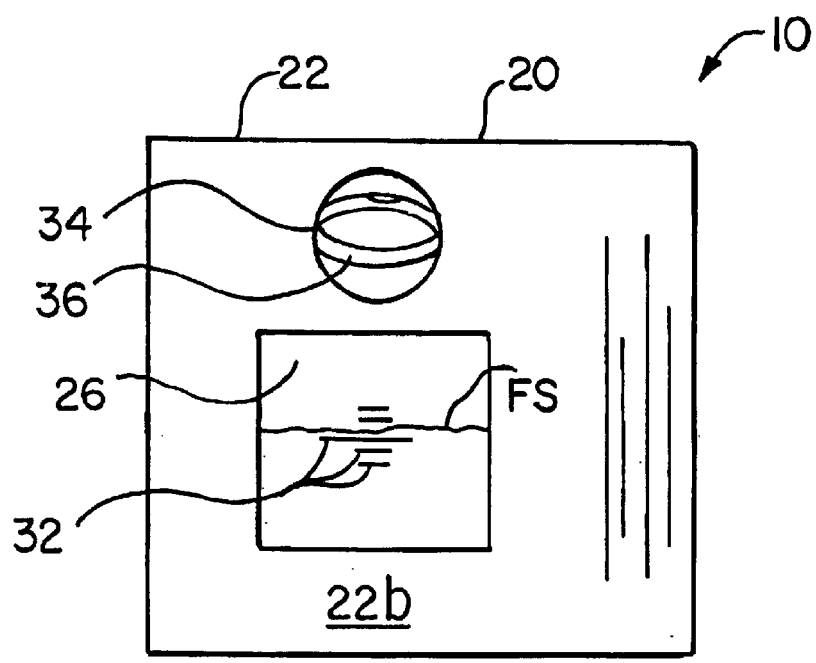
FIG. 3 is a front view of a variation of the first embodiment, having the optional, conventional bubble tube sight glass level integrated into the forward display wall of the abutment region, to give level readings across the user line of sight as the reservoir region abuts the object.

Referring to FIGS. 1–3, a level apparatus 10 is disclosed for indicating the orientation relative to vertical of a surface of an object toward or away from a user. Level apparatus 10 includes a fluid vessel 20 containing an indicator fluid F in the form of a liquid which preferably is pigmented for easy visibility, the fluid vessel 20 having a vessel abutment region 22 with a rearward abutment wall 22a for placing flat against a surface S to be evaluated for tilt and with a forward display wall 22b including a fluid display window 26 extending perpendicular to the user line of sight LOS with a fluid level indicating mark 32, the fluid surface FS being visible in the fluid display window 26 when the abutment wall 22a is generally upright and includes a vessel reservoir region 24 extending either rearwardly or forwardly from the vessel abutment region 22 along the user line of sight LOS, the vessel abutment region 22 and vessel reservoir region 24 being in mutual fluid communication so that fluid F in the vessel reservoir region 24 either flows into or out of the vessel abutment region 22 depending on the tilt of the level along the user line of sight LOS. The vessel reservoir region 24 must contain a sufficient quantity of fluid F that forward or rearward tilting of the rearward abutment wall 22a a number of degrees considered significant for the intended use creates a readily apparent change in the position of the fluid surface FS in the fluid display window 26 relative to the fluid level indicating mark 32 to make the tilt of the apparatus 10 and object surface S noticeable to the user.

For one embodiment the vessel abutment region 22 and vessel reservoir region 24 are upright boxes which are joined in full fluid communication at box ends to form substantially an L-shape along a horizontal cross-section. Fluid display window 26 can be an inset transparent or translucent panel in the forward display wall 22b or the entire vessel 20 can be translucent or transparent. Either a single indicating mark 32 in the form of a horizontal indicating line or a vertical series of horizontal indicating lines 32 is preferably provided for comparison to the position of the adjacent fluid surface FS to indicate tilt and, where present, the degree of tilt. The vessel abutment and reservoir regions 22 and 24 each may be shaped substantially as hollow half cylinders.

A conventional sight glass level 34 optionally is inserted into a sight glass level port 36 in the forward display wall 22b so that apparatus 10 simultaneously indicates the tilt of an upright object relative to vertical both along and across the user line of sight. The sight glass level 34 takes its reading from apparatus 10 orientation resulting from abutment of vessel reservoir region abutment wall 24a with an upright side of the object which is perpendicular to the side of the object which the rearward abutment wall 22a abuts from which fluid display window 26 takes its reading. See FIG. 3. In other words the addition of the sight glass level 40 to apparatus 10 permits the user to determine whether an object leans toward or away from the user, and simultaneously to determine whether the object leans to one side or the other as viewed by the user.

Figure 4:
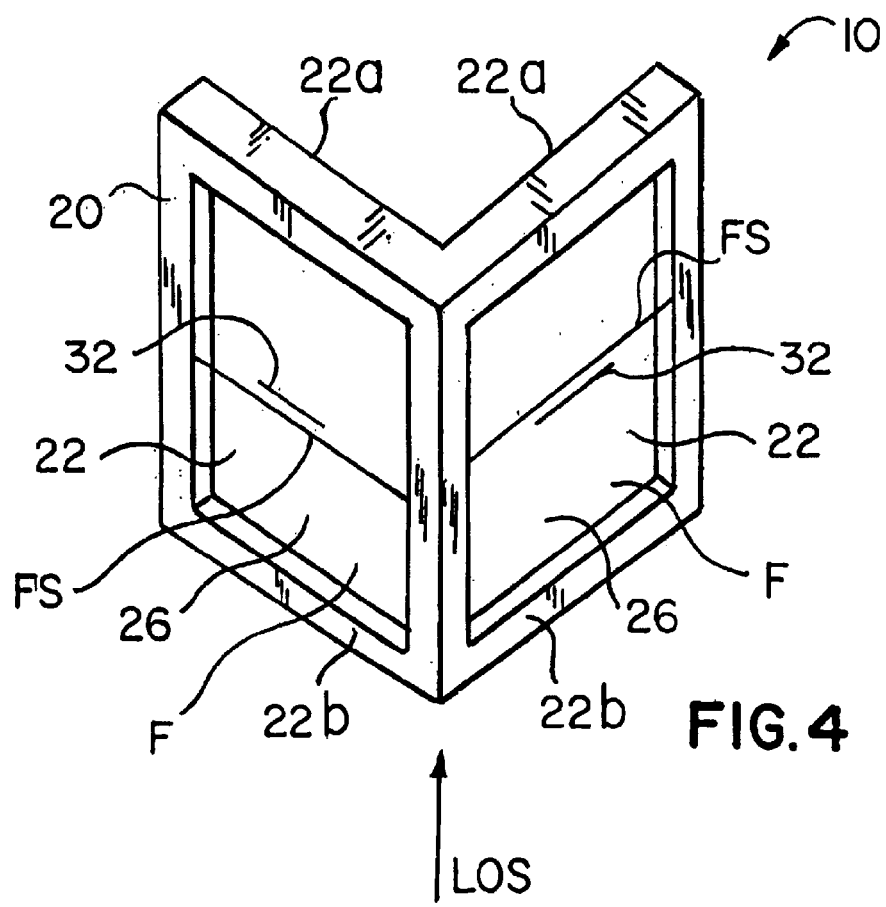
FIG. 4 is perspective view of a variation of the first embodiment having two abutment regions and no reservoir region.

A variation of the first embodiment has the same general configuration but omits the reservoir region 24 and has two abutment regions 22 in fluid communication with each other which meet to define an L-shape. See FIG. 1. Each abutment region 22 has a display wall 22b with a display window 26, and each abutment region 22 has a rearward abutment wall 22a, so that both abutment walls 22a may make simultaneous contact with two perpendicular object surfaces S to give level readings in two perpendicular directions at once, to show whether the object is entirely vertical. The user can view both display windows 26 at once from a diagonal line of sight, as illustrated in FIG. 4.

Second Preferred Embodiment

Figures 5, 6:
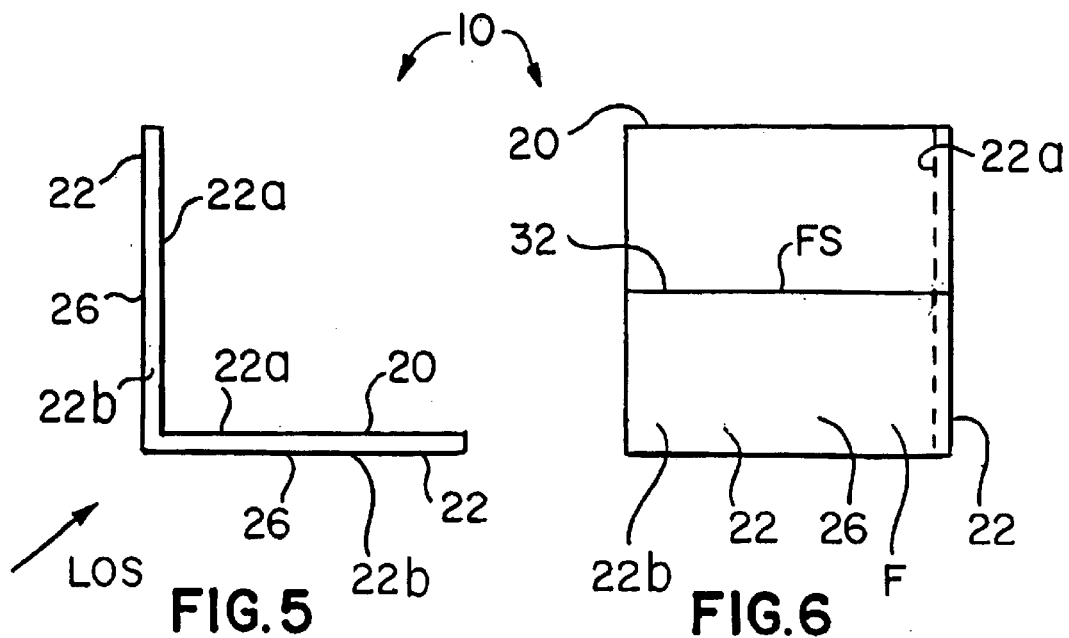
FIG. 5 is a top view of the variation of FIG. 4.
FIG. 6 is a side view of the variation of FIG. 4.
Figure 7:
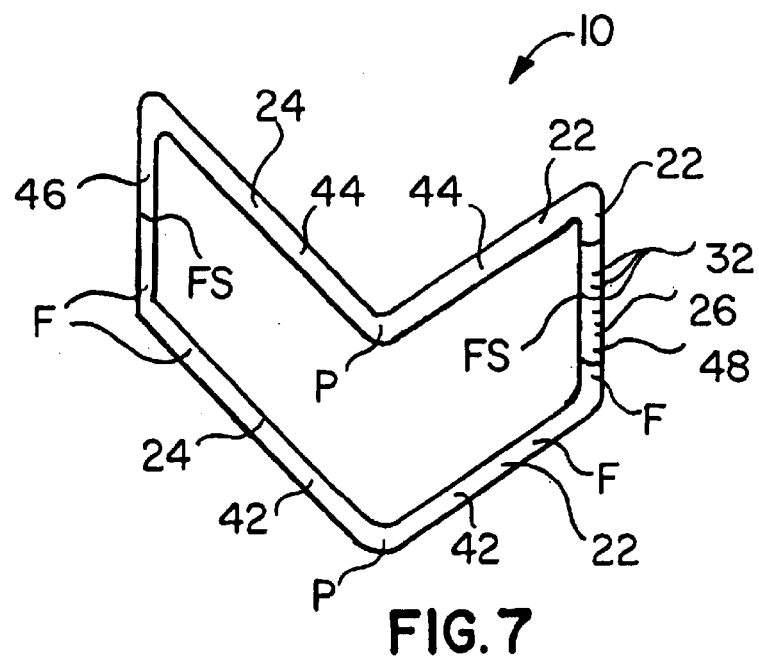
FIG. 7 is a perspective view of the second embodiment having the tube loop, the tube loop having a transparent tube wall revealing the indicator fluid.

For another embodiment fluid vessel 20 is a length of tube 40 joined at its ends to form a generally rectangular loop including upper and lower horizontal tube segments 42 and 44, respectively, and first and second vertical tube segments 46 and 48, the tube 40 being bent at opposing bend points P along upper and lower horizontal tube segments 42 and 44 to divide vessel 20 and define on one side of the bend vessel abutment region 22 and on the other side vessel reservoir region 24, the tube 40 containing the indicator fluid F. See FIG. 5. Vessel abutment region 22 includes first vertical tube segment 46 which in part or in whole is either translucent or transparent to function as the fluid display window 26 and preferably has at least one fluid level indicating mark 32. The vessel reservoir region 24 includes second vertical tube segment 48 which receives added fluid F when fluid F flows out of vessel abutment region 22 during backward apparatus 10 and object surface S tilting and releases subtracted fluid F during forward apparatus 10 and object surface S tilting. A tube 40 in the configuration of a continuous loop rather than a broken loop divided by closed ends or a barrier is preferred because air or other gas above the fluid F moves around loop 40 together with the fluid F so that no portion of the gas can become compressed during fluid F flow and thereby cause fluid flow resistance.

Third Preferred Embodiment

Figure 8:
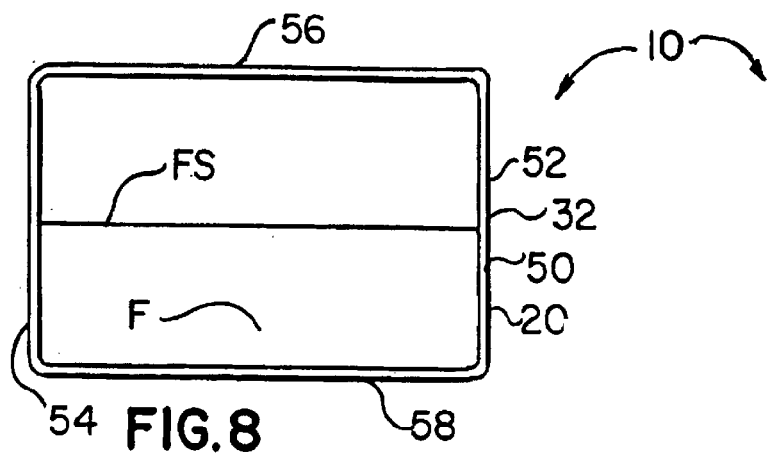
FIGS. 8 and 8a respectively are side and front views of the rectangular version of the third embodiment in which the reservoir region is omitted or combined into the abutment region so that the abutment region and reservoir region together define a single fluid chamber referred to as a display chamber.
Figure 8A:
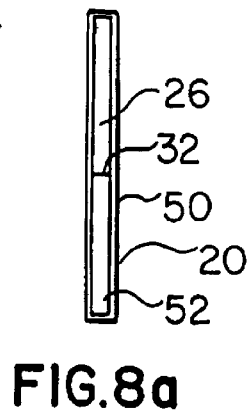
Figure 9:
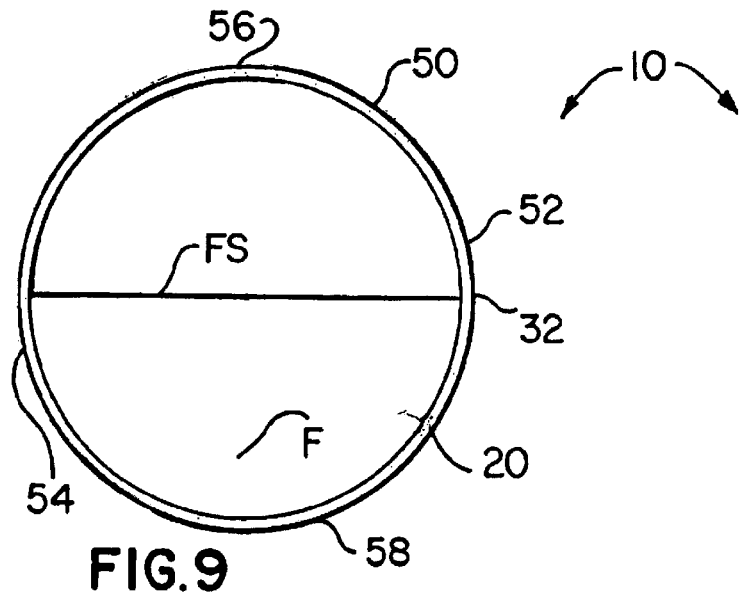
FIGS. 9 and 9a respectively are side and front views of the circular version of the third embodiment.
Figure 9A:
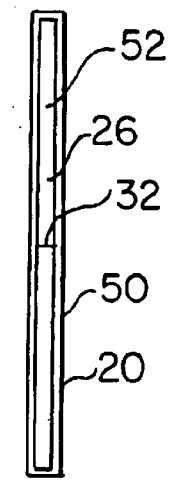
Figure 11:
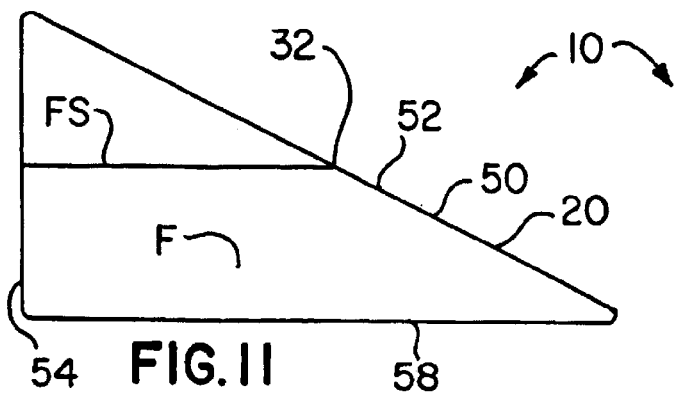
FIGS. 11 and 11a respectively are side and front views of the right triangular version of the third embodiment.
Figure 11A:
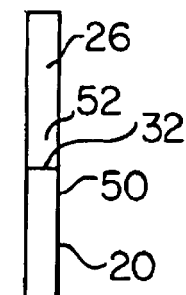

A third embodiment is provided in which the reservoir region 24 is either omitted or combined into the abutment region 22 so that the abutment region 22 and reservoir region 24 together define a single fluid chamber, which will be referred to as a display chamber 50. See FIGS. 8–11a. Display chamber 50 has a forward display wall portion 52 with a fluid display window 26 and fluid level indicating mark 32 and it is preferred that the display chamber 50 height and display chamber 50 depth each be several times the display chamber 50 width, so that display chamber 50 becomes relatively tall, deep and narrow, the depth giving more distinct tilt readings. The forward display wall portion 52, chamber rearward wall portion 54, chamber top wall portion 56 and chamber bottom wall portion 58 may define any of a wide variety of geometric shapes. A preferred such shape is rectangular, as illustrated in FIGS. 8–8a, so that the chamber rearward wall portion 54 becomes an abutment wall as in the first embodiment for placing against the object surface S and the forward wall becomes the forward display wall portion 52. Another contemplated shape is circular, as illustrated in FIGS. 9–10, and since rearward wall portion 54 is curved, an abutment panel 70 having an anchoring foot 72 is attached to one or both chamber side walls 62 and 64 of display chamber 50 extending parallel to the forward display wall 52. Either the rearward face 70a or forward face 70b of the abutment panel 70 may be placed against the object surface S. For rectangular and circular shape versions the chamber rearward wall portion 54 may also function as a display wall, and have a display window 26. Also, both will work the same wall in an inverted position. Yet another contemplated shape is that of a right triangle, as illustrated in FIGS. 11–11a, which is generally like the rectangle shape described above except that the chamber top wall 56 and forward display wall 52 are replaced with a hypotenuse wall, functioning as the forward display wall 52. Once again, the chamber rearward wall 54 becomes the abutment wall.

Fourth Preferred Embodiment

A fourth embodiment is provided which is similar to the tubular second embodiment except that the looped tube is not bent into an L-shape, but the entire looped tube is parallel to a single plane. Thus the reservoir region 48 once again is combined into the abutment region 46 so that the abutment region 46 and reservoir region 48 together define a single planar tube, which will be referred to as a display tube 80. See FIGS. 12–14. As for the second embodiment, the display tube 80 has generally horizontal tube segments 82 and 84, and display tube 80 has a display tube segment 92 with a transparent tube wall and a fluid level indicating mark 32.

Figures 12, 12A:
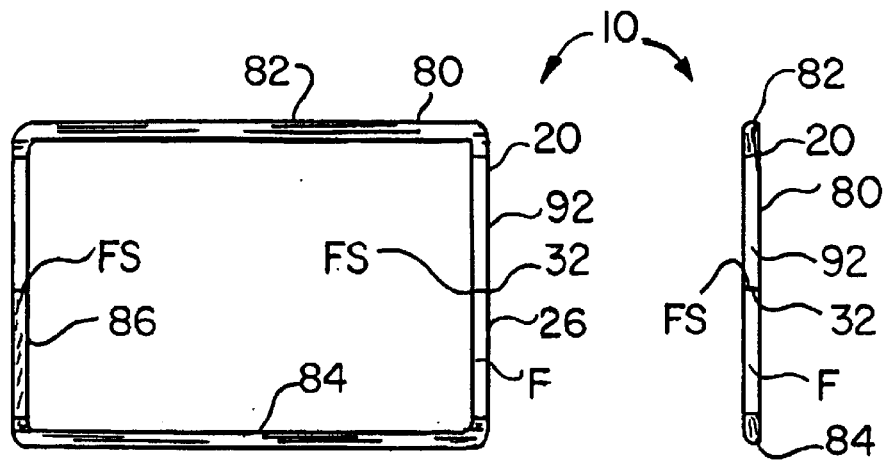
FIGS. 12 and 12a respectively are side and front views of the rectangular version of the tubular fourth embodiment.
Figures 13, 13A:
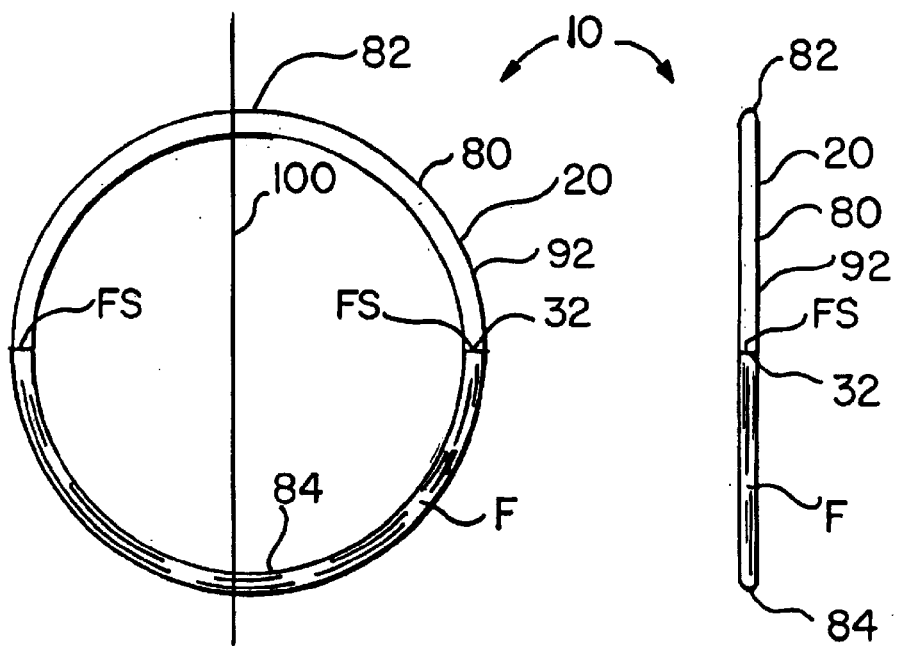
FIGS. 13 and 13a respectively are side and front views of the circular version of the tubular fourth embodiment.

Display tube 80 may take any of a wide variety of loop shapes, such as rectangular as illustrated in FIGS. 12–12a, in which the rearward vertical tube segment is an abutment tube segment 86 for placing against an object surface S. Another example of a tube 80 loop shape is circular as illustrated in FIGS. 13–14, and since the rearward tube portion is curved and thus is not suitable to function as an abutment surface, the tube top and bottom horizontal segments 82 and 84 pass through openings 102 in an abutment panel 100 extending parallel to the tangent line taken at the only or the central fluid indicating mark 32. The rearward face 100a or forward face 100b of the abutment panel 100 is placed against the object surface S. For either of these shapes, the apparatus 10 functions in the same way when inverted and the rearward tube segment may also function as a display segment 92 with a level indicating mark 32 so that the apparatus 10 can be rotated back to front and function in the same way.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A level apparatus for indicating the orientation relative to vertical of a surface of an object extending along a user line of sight, comprising:

a fluid vessel containing an indicator fluid including a liquid and having a fluid surface, said fluid vessel having a vessel abutment region with a rearward abutment wall for placing against a surface of an object to be evaluated for tilt and having a forward display wall including a fluid display window extending generally perpendicular to the user line of sight, the fluid surface being visible in the fluid display window when said abutment wall is substantially upright, and includes a vessel reservoir region extending at least one of: rearwardly and forwardly from the vessel abutment region along the user line of sight, said vessel abutment region and said vessel reservoir region being in mutual fluid communication such that said fluid surface extends across said fluid display window and from said fluid display window into said vessel reservoir region and such that said fluid in said vessel reservoir region flows into and out of said vessel abutment region depending on the tilt of said apparatus along the user line of sight and thereby alters the elevation of the fluid surface in said fluid display window;

wherein said reservoir region contains a sufficient quantity of said fluid that substantial tilting of said abutment wall in one of a forward direction and a rearward direction creates a readily apparent change in the position of the fluid surface visible in said fluid display window to make the tilt of said apparatus and of the surface of the object noticeable to the user.

2. The level apparatus of claim 1, wherein said fluid is pigmented for easy visibility.

3. The level apparatus of claim 1, wherein said vessel abutment region and said vessel reservoir region are upright boxes which are joined in full fluid communication at box ends to form a vessel which is substantially L-shaped along a horizontal cross-section.

4. The level apparatus of claim 1, wherein said fluid display window is a panel inset into a port in said display wall.

5. The level apparatus of claim 1, additionally comprising a fluid indicating mark on said display window for comparison with the position of the fluid surface.

6. The level apparatus of claim 5, comprising a plurality of said fluid level indicating marks to indicate the extent of apparatus and object surface tilt.

7. The level apparatus of claim 1, wherein said vessel abutment region and said vessel reservoir region are each shaped substantially as hollow half circular cylinders.

8. The level apparatus of claim 1, wherein said vessel is configured as a length of tube joined at its ends to form a continuous and substantially rectangular tube loop, said tube loop comprising upper and lower generally horizontal tube segments and first and second generally vertical tube segments, said tube being bent at opposing vessel region dividing points along said upper and lower horizontal tube segments to define on one side of said vessel abutment region and on the other side said vessel reservoir region, said tube containing said fluid.

9. A level apparatus for indicating the orientation relative to vertical of a surface of an object extending along a user line of sight, comprising:

a fluid vessel containing an indicator fluid including a liquid and having a fluid surface, said fluid vessel having a vessel abutment means for placing against a surface of an object to be evaluated for tilt and having a forward display wall including a fluid display window for extending generally perpendicular to the user line of sight, the fluid surface being visible in the fluid display window when said abutment wall is substantially upright such that said fluid surface extends across said fluid display window and simultaneously extends into said vessel reservoir region and such that said fluid in said vessel flows against and away from said fluid display window depending on the tilt of said apparatus along the user line of sight and thereby alters the elevation of the fluid surface visible in said fluid display window;

wherein said vessel is of sufficient depth along the user line of sight that substantial tilting of said vessel in one of a forward direction and a rearward direction creates a visible change in the position of the fluid surface visible in said fluid display window to make the tilt of said apparatus and thus of the surface of the object observable to the user.

10. The level apparatus of claim 9, wherein said fluid is pigmented for easy visibility.

11. The level apparatus of claim 9, wherein said fluid display window is a panel inset into a port in said display wall.

12. The level apparatus of claim 9, additionally comprising a fluid indicating mark on said display window for comparison with the position of the fluid surface.

13. The level apparatus of claim 12, comprising a plurality of said fluid level indicating marks to indicate the extent of apparatus and object surface tilt.

14. The level apparatus of claim 9, wherein said vessel is configured as a length of tube joined at its ends to form a continuous and substantially rectangular tube loop, said tube loop comprising upper and lower generally horizontal tube segments and first and second generally vertical tube segments.

15. The level apparatus of claim 9, wherein said vessel abutment means comprises an abutment structure connected to and projecting laterally from said vessel and having an abutment surface substantially parallel to said display window, for placing against a surface of an object to be evaluated for tilt.

16. A level apparatus for indicating the orientation relative to vertical of two surfaces of an object, comprising:

a fluid vessel containing an indicator fluid including a liquid and having a fluid surface, said fluid vessel including at least two vessel abutment regions each having an abutment wall, said abutment walls being substantially perpendicular to each other, such that said abutment walls may be placed against substantially perpendicular surfaces of an object to be evaluated for tilt in two directions simultaneously, and each said vessel abutment region having a forward display wall including a fluid display window such that said fluid display windows are viewable within a user line of sight simultaneously, the fluid surface being visible in both said fluid display windows when said abutment walls are substantially upright, such that said fluid surface extends across said fluid display window and from said fluid display window into said vessel reservoir region and such that said fluid in said vessel flows against and away from said fluid display windows depending on the tilt of said apparatus at least one of: forwardly and rearwardly and laterally, and thereby alters the elevation of the fluid surface in each said fluid display windows;

wherein said vessel is of sufficient depth along the user line of sight that substantial tilting of said vessel in one of a forward direction and a rearward direction and in one lateral direction creates a readily apparent change in the position of the fluid surface visible in each said fluid display window to make the tilt of said apparatus and thus of the surfaces of the object in two substantially perpendicular directions simultaneously observable to the user.

* * * * *